United States Patent [19]

Hudson et al.

[11] 4,159,642

[45] Jul. 3, 1979

[54] AIRCRAFT TRANSMISSION TEST SET

[75] Inventors: George S. Hudson, Hamden; Madan M. Roy, Milford, both of Conn.

[73] Assignee: Avco Corporation, Stratford, Conn.

[21] Appl. No.: 882,870

[22] Filed: Mar. 2, 1978

[51] Int. Cl.² .......................................... G01M 13/02
[52] U.S. Cl. .................................................... 73/118
[58] Field of Search .............................. 73/118, 133 R

[56] References Cited
U.S. PATENT DOCUMENTS 3,179,887  4/1965  Crumbliss ............................ 73/118

Primary Examiner—Anthony V. Ciarlante
Attorney, Agent, or Firm—Ralph D. Gelling; Robert J. McNair, Jr.

[57] ABSTRACT

The disclosure illustrates a closed loop aircraft transmission test set comprising a variable speed DC motor driving a speed changing gear box whose output shaft is coupled to the input of the transmission under test, the main output shaft of the transmission being coupled to a DC generator load, the output of the generator being used to supplement the input electric power used to operate the DC driving motor thus assuring power drain from the supply busses is only the amount needed to overcome system friction and efficiency losses.

8 Claims, 2 Drawing Figures

AIRCRAFT TRANSMISSION TEST SET

BACKGROUND OF THE INVENTION

This invention provides a means for testing large sized transmissions. In particular the invention is useful in testing transmissions which couple a pair of turbine engines to the rotor of a helicopter. A typical helicopter transmission will have two input shafts. Each input will connect to the shaft output of a turbine engine. Under full load conditions the input shafts will rotate at about 12,000 rpm. Typically, the transmission will have two outputs. One output will be from a shaft which rotates at perhaps 3000 rpm and is used to drive the tail rotor. The main lift rotor of the helicopter is driven from a transmission output shaft which rotates at about 190 rpm. Total power fed to a transmission can be over 3,000 Hp. The transmission and gearing contained therein must be sized to handle this power level. Consequently many transmissions have an overall volume that is in excess of 25 cu. ft.

A transmission has to be tested before it can be incorporated into the design of an aircraft. Tests include checking such things as reliability, life expectancy and efficiency. The life cycle tests may run as long as 2,000 hours. Testing was originally done by configuring a test stand so that the transmission was driven by the same engines that would be used in flight. Operating these engines for long periods of time not only wore them out but also created a noise problem for workers in the vicinity. The engine driven test set up was also costly to operate due to the fact that the energy coming out of the transmission had to be dissipated into something. Many test set ups used a water brake. Expending several thousand horsepower for hundreds of hours is a costly undertaking.

More recently, a closed loop mechanical system has been used for testing transmissions. With this approach an electric drive motor is shaft coupled to the input of the transmission. To assure rated speed at the transmission input shaft, the coupling from the drive motor may include use of a speed changing gear box. The output shaft of the transmission is coupled to a right angle gear box. By right angle gear box is meant that the output shaft of the gear box is at a 90 degree angle with respect to the input. Using three such right angle gear boxes coupled one to the next by appropriate lengths of shafting will bring the output shaft of the third gear box pointing at the input shaft coupling the drive motor to the transmission. By placing a differential gear case between the drive motor and the input to the transmission, the output from the third right angle gear box can be coupled back into the input drive of the transmission. Placement of a rotating differential gear box between the second and third right angle gear boxes completes the test set up. An external drag force applied to the rotating cage member of this differential gear box serves to load up the transmission whenever the drive motor operates. This closed loop system is commonly known as a four-square test set up with dynamic torque applied by a differential gear train.

Other mechanical four-square test set ups have been configured. All of the prior art systems have certain deficiencies. With some a power dynamometer or variable speed brake is required to absorb the output power of the transmission. In the four-square mechanical feedback loop systems, the mechanical resonances of the closed loop system can cause an inordinate amount of wear on the gears within the system. When two similar transmissions are arranged in a loop configuration, the resulting test set-up becomes very complex.

SUMMARY OF THE INVENTION

The test set-up disclosed in this invention comprises an electronically controlled system having great versatility. With the system of applicants a DC motor drives each input shaft of the transmission under test. A step-up gear box may be needed to increase the output shaft speed of the motor to the rated input speed of the transmission. The output shaft of the transmission is coupled to one or more DC generators which both acts as a load on the transmission and generates electricity which is fed back to the input of the DC drive motor. Prime power from the utility is supplied to the DC driving motor through an AC-to-DC power converter. The power drain on the source from the utility is only that which is required to make up test system and transmission losses.

Use of DC motors and generators enables testing of the mechanical transmission at any desired operating speed over a wide range of load conditions. Furthermore, using applicants system, the transmission under test can be run up to any desired speed for initial checkup. After a satisfactory "no load test" is completed, the transmission can then be gradually loaded to any desired power level by controlling the field current of the electric generators.

A tachometer on the shaft of the drive motor senses speed. A closed loop feedback control system from the tachometer to the power converter corrects motor speed by varying system voltage. Any number of input shafts to the transmission can be accommodated by coupling a separate motor to each input shaft. Torques applied at the input shafts of the transmission can be synchronized through voltage control of the field and armature of each DC motor. Rated speed at each input shaft of the transmission can be obtained by the use of step-up gearbox drive units interposed between the motor and the transmission. Similarly, the speed of the output shaft of the transmission can be matched to the generator by the use of appropriate gearboxes.

DESCRIPTION OF THE PREFERRED EMBODIMENT

Figure 1:
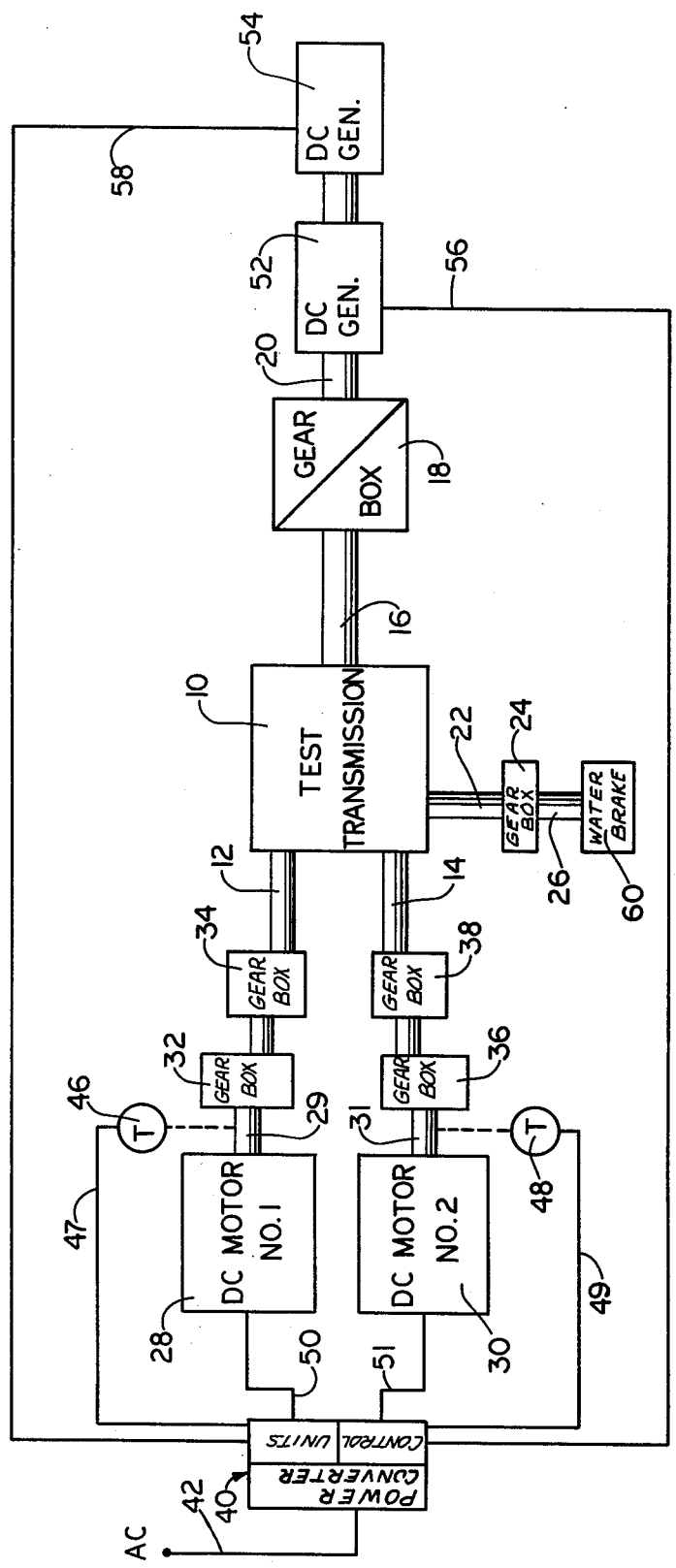
FIG. 1 is a block diagram of a transmission test set having a dual input and a dual output, one output being the main output and the other output being an accessory drive.

FIG. 1 is a block diagram of the aircraft transmission test set which was reduced to practice. The aircraft transmission 10 had two input shafts 12 and 14. Each input shaft would, in the aircraft, be driven by a separate turbine engine. The transmission, itself, was intended for use in a helicopter. As such, there were two outputs, output shaft 16 is the main output and in the airframe serves to power the main rotor of the helicopter. A secondary output shaft 22 is used to power the tail rotor of the helicopter through accessory gearbox 24 and shaft 26.

In the unit reduced to practice, the 100 percent rated speed of rotation of shafts 12 and 14 was 12,000 rpm. With the inputs operating at full rated values, main output shaft 16 rotated at 190 rpm and accessory output shaft 22 rotated at 3000 rpm. Transmission 10 was sized to handle rated input power levels of 1,500 Hp at each of the two input shafts 12 and 14.

Power to drive the two inputs of transmission 10 was supplied by DC drive motors 28 and 30. It will be appreciated that drive motors 28 and 30 have to be physically large in order to supply rated amounts of power to the transmission under test. Further, large size electric motors do not rotate at upwards of 12,000 rpm. Specifically, in the unit reduced to practice, output shafts 29 and 31 of motors 28 and 30 operated at 1,150 rpm. In order to raise the motor shaft of 1,150 rpm to the 12,000 rpm required at the input of the transmission some step-up gearboxes are used. Gearboxes 32 and 34 provide the 10.5 to 1 step-up between motor 28 and input shaft 12 of transmission 10. In a similar manner, gearboxes 36 and 38 serve to increase the output shaft speed of motor 30 so as to match the speed requirements of input shaft 14 of transmission 10. Use of offset gearboxes 32, 34, 36 and 38 accomplish an additional desirable result. Motors 28 and 30 are physically large. This means that shafts 29 and 31 are spaced a considerable distance apart. Shafts 12 and 14 of transmission 10 are usually closer together than are the shafts of adjacent motors 28 and 30. Use of speed changing gearboxes wherein the input and output shafts are parallel but offset makes it possible to utilize physically large motors 28 and 30 to drive the closer spaced shafts 12 and 14 of transmission 10.

Power to energize DC motors 28 and 30 is supplied by power converter and control unit 40. In the unit reduced to practice, motors 28 and 30 were supplied from a 550 volt DC source. The 550 volt DC power was derived from AC supplied to power converter and control unit 40. The AC was rectified in unit 40. A separate rectifier was used to supply each motor. Additional DC power was supplied by the generators.

The rotational speed of motor 28 was monitored by a first tachometer 46 attached to shaft 29. The speed proportional signal on line 47 was fed back to the control circuitry within unit 40 to maintain the parameters of motor 28 within preset specifications. In a like manner a second tachometer 48 attached to shaft 31 controls the operating characteristics of motor 30 via feedback line 49. It will be understood that lines 50 and 51 are representative. In actual practice line 50 will consist of conductors which separately supply both the armature and field windings of motor 28. Typical means for accomplishing speed control of DC motors are shown on page 15–50 of *Mechanical Engineers' Handbook*, T. Baumeister, Editor, McGraw-Hill Book Co., Inc., New York, 1958.

The main output of transmission 10 appears on shaft 20 which is seen as the outut of right angle gearbox 18. DC generators 52 and 54 are serially coupled to shaft 20. Application of field current to these generators will cause each to begin producing 550 volt electric power. This will load down transmission 10.

Power generated by DC generator 52 is fed back via line 56 to power converter and control unit 40. There it is used to supplement the DC power supplied to motor 30. In a similar manner DC power coming from generator 54 is passed via line 58 back to unit 40 where it is used to supplement the power furnished to motor 28.

There is a separate DC generator for each drive motor. This accomplishes two things. First, it allows the generators to be sized the same as the drive motors. This is important when dealing with motors rated at hundreds of horsepower. Second, experience has shown that no two DC motors are exactly alike. This being the case, it may be necessary to operate motor 28 at slightly different voltage levels than are needed to make motor 30 supply the same speed and torque characteristics. Use of an individual generator for each drive motor makes it possible to optimize control of all motors.

In the system reduced to practice, the accessory output from transmission 10 was loaded to rated values by means of water brake 60. Experience has shown that loads of a few hundred horsepower can be efficiently handled by a water brake. By efficiently handled is meant that when costs of both capital equipment and energy dissipation in the brake are considered, it is less costly to dump the accessory output power in the manner shown in FIG. 1 than it would be to use another generator load of the type connected to main output shaft 20.

Figure 2:
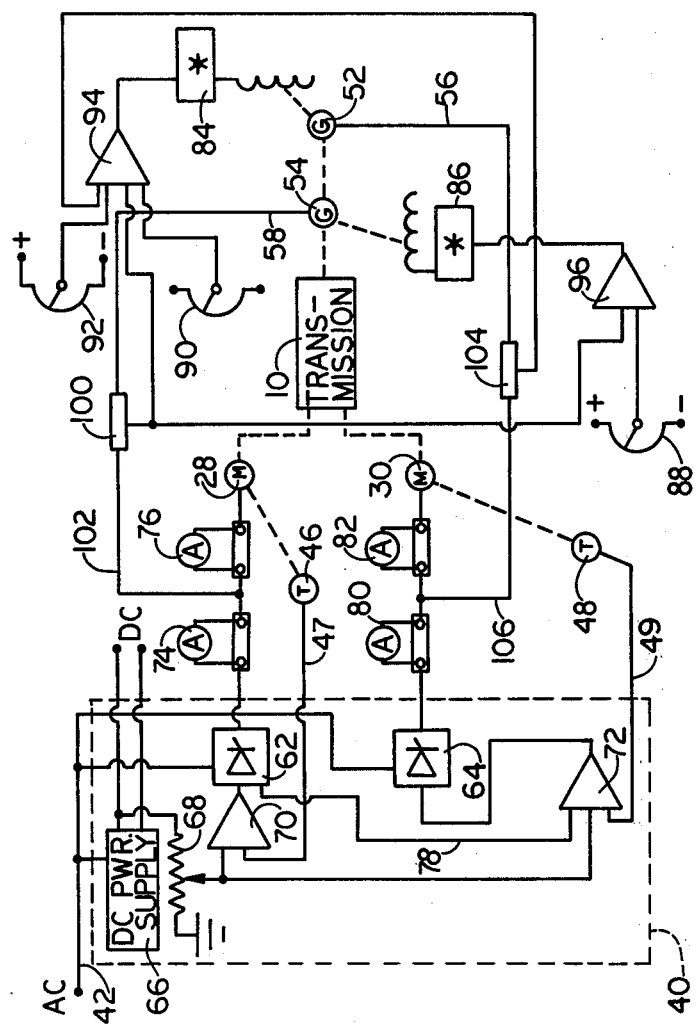
FIG. 2 is a schematic diagram of the controls used with the FIG. 1 system.

FIG. 2 shows a schematic diagram, partially in block diagram form of the control system from the transmission test set. Like elements are similarly labeled in FIGS. 1 and 2. Alternating current power on line 42 is supplied to power converter 62, power converter 64 and control circuit power supply 66. A positive voltage from power supply 66 is selected via potentiometer 68 for use in establishing a preset reference on operational amplifiers 70 and 72. The second input to operational amplifier 70 is supplied from tachometer 46 which connects to the shaft of drive motor 28. The output of amplifier 70 controls the point in the phase angle at which power converter unit 62 fires. Phase angle control determines the DC voltage level output of the power converter unit. Power from converter unit 62 passes through shunted ammeters 74 and 76 and thence into motor 28. In a similar fashion feedback from tachometer 48 serves to control the value of DC voltage supplied by power converter unit 64 to motor 30. Line 78 connecting converter unit 62 to operational amplifier 72 serves to interlock the power buildup from motor 30 with that of motor 28.

As motors 28 and 30 come up to rated speed the output shaft of transmission 10 will also bring the rotors of generators 52 and 54 up to speed. Generator voltages will be matched by automatic regulation of their field currents. Field current control is symbolically shown by elements 84 and 86. Field current for generator 54 is established by load set potentiometer 88. Load set potentiometer 90 establishes the field current for generator 52 and load balance potentiometer 92 serves to adjust the percentage load picked up by each of the two generators. Operational amplifiers 94 and 96 serve to match the current requirements of the field windings to the specified levels.

Power generated by generator 54 passes along line 58, through dropping resistor shunt 100, line 102 and thence to the junction between ammeters 74 and 76. In a similar fashion, power generated by generator 52 passes along line 56, through dropping resistor shunt 104, along line 106 and thence to the junction between ammeters 80 and 82. The level of current flowing through dropping register shunts 100 and 104 serve to signal operational amplifiers 94 and 96 respectively as regards the power being generated in each generator.

By using two ammeters in the supply line to each motor, the system operator can monitor the total current furnished to a motor and also the current being delivered from power converter units 62 and 64. The difference between the two ammeter readings represents current from the attached generator. Under full load test conditions, the sum of the currents in ammeters 74 and 80 represents system losses plus any power being supplied through accessory output shaft 22 (See FIG 1).

In summary, the transmission test set comprises primarily of any number of Dc motors at appropriate speed to provide drive to the input shafts of the transmission under test. The output shafts of the transmission are coupled to a like number of DC generators at appropriate speeds to generate electricity which is fed back to the DC input drive motors in a closed loop power feedback system.

The power losses in the whole drive train are obtained from the utility electrical power supply through an AC to DC power converter. This sysem enables testing of the mechanical transmission at any desired power and speed with only the loss power drawn from the utility.

Owing to the relative freedom of operating speeds and torques of the DC motors and generators within a wide range, the test equipment properly selected can cater for the needs of a large variety of mechanical transmissions to be tested. The test set reduced to practice has dual speed-control feedback loops. Likewise, there are dual load control loops. This makes it possible to completely simulate the characteristics of a typical pair of twin engines used to drive a single propeller load. Overrunning clutches within the transmission allow failure of one engine with the other engine continuing on load. Bandpass loop response can be made such that it eliminates mechanical resonance problems which cause excessive wear on the gears of the transmission. The test equipment shown in FIGS. 1 and 2 can be used with many different transmission configurations. FIG. 1 depicts a transmission having dual input shafts which are parallel. For a dual input transmission having shafts extending at other angles, the same set of test equipment can be used by repositioning the drive motors. The controls shown in FIG. 2 make it possible to adjust the transmission load anywhere from zero to rated capacity. Over this range, data taken on the system reduced to practice shows that the preset transmission load can be maintained within an accuracy of 0.5 percent.

The foregoing detailed description is given for clearness of understanding. No unnecessary limitations are to be understood therefrom. Modifications will be readily apparent to those skilled in the art and are included within the spirit and scope of the invention.

We claim:

1. A test set for performing life cycle measurements on a large sized transmission having ratio changing gearing therein, said transmission including at least one input shaft, each such input shaft being useful for receiving driving power from an engine source, said transmission including both a main output shaft and an auxiliary output shaft, said test set comprising:
   at least one variable speed DC motor, each of said motors having voltage input terminals and having an output shaft, said output shaft being connected by first coupling means to an input shaft of said transmission, each of said motors being sized to equal the full load power rating of the transmission input shaft to which said motor is coupled;
   a power converter having as many sets of DC voltage output terminals as there are DC motors, each of such sets of terminals encircuited with the input terminals of each of said variable speed DC motors, the input of said power converter being encircuited with a prime power source;
   means for monitoring the rotational speed of each of said motor output shafts, said means including generation of a voltage output signal whose parameters are proportional to the rotational speed of said motor output shaft, said output signal being encircuited to provide a feedback control voltage to said power converter for use in correcting the speed of each of said DC motors;
   power absorbing means coupled to the auxiliary output shaft of said transmission for loading the auxiliary output to its full rated value; and
   generator means drivingly coupled to the main output shaft of said transmission, said generator means being sized to equal the full power rating of said transmission, said generator means having output terminals for supplying electric energy to a load, said load serving to load down said transmission, the magnitude of said load being adjustable by control of the field current of said generator means, the output terminals of said generator means being encircuited to supplement the power drain from said prime power source whereby the net system power consumption is only the amount needed to overcome test set and transmission internal losses.

2. The invention defined in claim 1 wherein the first coupling means between each of said DC motors and the respective input shaft of said transmission includes ratio changing gear boxes for converting the rated shaft speed of each of said motors to the specified rated speed of the respective input shaft of said transmission.

3. The invention defined in claim 2 wherein the second coupling means between said generator means and the output shaft of said transmission includes a ratio changing gearbox for converting the rated rotational speed of said transmission output shaft to the specified rated shaft speed of said generator means.

4. The invention defined in claim 3 wherein the transmission test set includes two variable speed DC motors, each having voltage input terminals, the output shaft of the first of said two motors being connected by one element of the first coupling means to the first input shaft of a dual input transmission, the output shaft of the second of said two motors being connected by a second element of the first coupling means to the second input shaft of a dual input transmission.

5. The invention as defined in claim 4 wherein the generator means comprises two DC generators of equal power rating having their driving shafts coaxially and serially coupled one to the other, each of said generators being electrically rated with the same full load voltage and current parameters as are possessed by the two variable speed DC motors.

6. The invention as defined in claim 4 wherein the power and voltage rating of each of the variable speed DC motors is 1500 Hp at 550 vdc.

7. The invention as defined in claim 1 wherein the means for monitoring the rotational speed of each of said motor output shafts includes the use of tachometers.

8. The invention as defined in claim 1 wherein the power absorbing means coupled to the auxiliary output shaft of the transmission is a waterbrake.

* * * * *